United States Patent [19]
Takagi et al.

[11] Patent Number: 5,446,582
[45] Date of Patent: Aug. 29, 1995

[54] OPERATION MICROSCOPE

[75] Inventors: Kazutoshi Takagi; Nobuaki Kitajima, both of Tokyo, Japan

[73] Assignee: Kabushiki Kaisha TOPCON, Tokyo, Japan

[21] Appl. No.: 217,132

[22] Filed: Mar. 24, 1994

Related U.S. Application Data

[63] Continuation of Ser. No. 947,373, Sep. 18, 1992, abandoned, which is a continuation of Ser. No. 569,038, Aug. 17, 1990, abandoned.

[30] Foreign Application Priority Data

Aug. 23, 1989 [JP] Japan ................... 1-217071

[51] Int. Cl.⁶ .................. G02B 21/06; G02B 21/36
[52] U.S. Cl. ...................... 359/385; 359/363; 359/368
[58] Field of Search ............ 350/523–528, 350/502, 507, 518–527; 359/368–390, 462–477; 351/205, 206

[56] References Cited

U.S. PATENT DOCUMENTS

| 3,421,806 | 1/1969 | Weber | 350/527 |
|---|---|---|---|
| 3,551,019 | 12/1970 | Michel | 350/526 |
| 4,148,552 | 4/1979 | Suzuki et al. | 358/389 |
| 4,209,225 | 6/1980 | Kumiomi et al. | 350/518 |
| 4,302,087 | 11/1981 | Reinheimer et al. | 350/502 |
| 4,515,445 | 5/1985 | Müller et al. | 359/389 |
| 4,619,503 | 10/1986 | Reinheimer et al. | 359/385 |
| 4,897,537 | 1/1990 | Lichtman et al. | 350/527 |
| 4,879,537 | 1/1990 | Miyamoto et al. | 359/389 |

FOREIGN PATENT DOCUMENTS

| 3327672 | 2/1985 | Germany | 350/523 |
|---|---|---|---|
| 3328821 | 2/1985 | Germany | 350/523 |
| 146113 | 11/1981 | Japan | 350/523 |
| 194217 | 8/1988 | Japan | 359/385 |
| 1164911 | 6/1989 | Japan | 350/523 |
| 2122385 | 1/1984 | United Kingdom | 350/523 |

Primary Examiner—Loha Ben
Assistant Examiner—Thong Nguyen
Attorney, Agent, or Firm—Armstrong, Westerman, Hattori, McLeland & Naughton

[57] ABSTRACT

According to the invention, in an operation microscope comprising an illumination optical system for irradiating an observation object, a recording optical system for receiving the reflected light from an observation object for recording and an observation optical system for receiving the reflected light from an observation object for observation, there is disposed a light dividing penetration member wherein an optical axis of the recording optical system and at least part of an optical axis of the illumination optical system coexist. In this operation microscope, due to the light dividing penetration member, the optical axis of the recording optical system and at least part of the optical system of the illumination optical system are arranged coaxially, so that the reflected light from the region of an observation objective irradiated with the illumination optical system always penetrates through the light dividing penetration member and continues through the recording optical system, is provided for recording. Accordingly, the angles between the respective optical axes become small, so even when an observation object exists at the bottom of a deep hole, its image can be recorded with certainty.

2 Claims, 3 Drawing Sheets

OPERATION MICROSCOPE

This application is a continuation of application Ser. No. 07/947,373, filed Sep. 18, 1992, now abandoned, which is a continuation of Ser. No. 07/569,038, filed Aug. 17, 1990, now abandoned.

BACKGROUND OF THE INVENTION

1. Field of the Invention

The invention relates to an operation microscope, particularly to an operation microscope wherein the observation optical system and the recording optical system are improved with respect To an observation objective.

2. Description of the Prior Art

Referring to FIG. 1 illustrating the prior art, problems thereof will be explained.

An operation microscope 20 illustrated in FIG. 1 includes a tube 22 equipped with an objective lens 21 at its lower end, an illumination optical system 23 attached to the tube 22, an eyepiece tube 24 attached to the tube 22 in its upped portion and a decoding optical system 27 attached to the tube 22 at its side wall comprising a relay lens system 25 for a TV camera and a TV camera 26.

Within the above-described tube 22, there are arranged a variable power optical system 28 for providing an a focal variable power for an observation image above the objective lens 21, an image forming lens 29 and an erect prism (Dachprisma) 30 respectively.

Also, in the eyepiece tube 24 there are arranged a reflection prism 31 for reflecting light from the aforementioned erect prism 30, a total reflection prism 32 and an eyepiece lens 33.

Optical elements from the variable power optical system 28 to the eyepiece lens 33, inclusive, constitute the observation optical system 34.

The illumination optical system 23 comprises a light source La, such as a halogen lamp, a condensing lens 40 and a reflection mirror 36, Light from the light source La is thus collected by a condensing lens 40 and then reflected to an objective lens 21 by means of the reflection mirror 36, so that an observation objective 0 is irradiated with the light through the objective lens 21.

The above-described recording optical system 27 comprises a relay lens system 25 for a TV camera attached to the tube 22, a TV camera 28, a variable power optical system 37 for introducing selected light from the objective lens 21 to the relay lens system 25 for a TV camera and a mirror 38. An optical axis $C_1$ of this recording optical system 27 is disposed at a position opposite to an optical axis $C_2$ of the illumination optical system 23 with an optical axis $C_0$ of the observation optical system 34 as the center.

In the case of an operation microscope 20 as illustrated in FIG. 1, when the object 0 for observation is located at the bottom of a deep hole, such as the interior of an ear, as shown in the figure, the light path for the recording optical system 27 is obstructed by the deep hole due to the angular spread between the optical axis $C_1$ and an optical axis $C_2$ of the illumination optical system. There thus arises a problem in that recording by a TV camera 26 becomes impossible,

OBJECTS AND SUMMARY OF THE INVENTION

The present invention was created under the conditions described above. Its object is therefore to provide an operation microscope whereby even when an observation object is located at the bottom of a deep hole, its image can be recorded with certainty.

According To the invention, an operation microscope comprising an illumination optical system for irradiating an object for observation, a recording optical system for recording the reflected light from the observation object and an observation optical system for observing the reflected light from the observation object, there is provided a light dividing penetration member wherein an optical axis of the recording optical system and at least part of an optical axis of the illumination optical system coexist.

In the operation microscope of the invention, since the optical axis of the recording optical system and at least part of the optical axis of the illumination optical system are disposed in coaxial relation the reflected light from the region of an observation object, irradiated with the illumination optical system, always passes through the light dividing penetration member, then continues through the recording optical system for recording purposes. Therefore, the angles between respective optical axes become small. So, even when an observation object is located at the bottom of a deep hole, its image can be accurately recorded.

By employing a beam splitter for the aforementioned light dividing penetration member, arrangement of respective members becomes easy, so that construction of the apparatus as a whole is simplified.

Then, by installing a reflection mirror for transferring light penetrating the dividing member from the illumination optical system to an observation object, the illumination light can be used efficiently.

DESCRIPTION OF THE PREFERRED EMBODIMENTS

Figure 2:
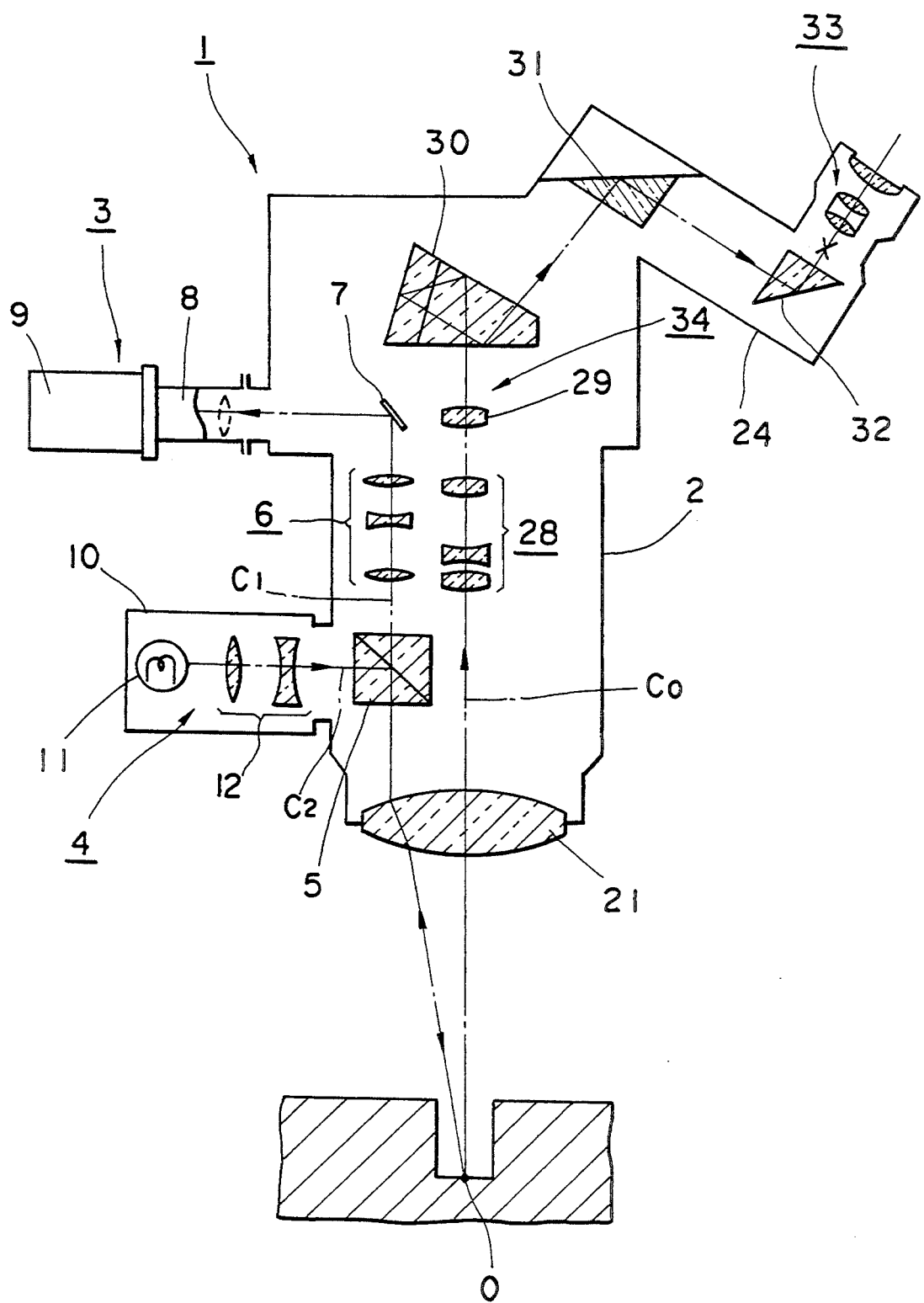
FIG. 2 is a schematic sectional view of an embodiment of the present invention.

FIG. 2 illustrates an embodiment of the present invention.

An operation microscope 1 of the figure comprises a tube 2 with an objective lens 21 in its lower end, an illumination optical system 4 attached to the tube 2, an eyepiece tube 24 attached to the tube 2 in its upper portion and a recording optical system 3 attached to the tube 2 at its side wall, consisting of a relay lens system 8 for a TV camera and a TV camera 9.

Within the said tube 2, there are a variable power optical system 28 for providing an a focal variable power for an observation image above an objective lens 21, an image forming lens 29 and an erect prism(Dachprisma) 30 arranged in this order.

Then, in the eyepiece tube 24 a reflection prism 31 for reflecting light from the said erect prism 30, a total reflection prism 32 and an eyepiece 33 are disposed.

Respective optical elements from the said variable power optical system 28 to the eyepiece 33, inclusive, constitute the observation optical system 34.

The illumination optical system 4 comprises a light source 11, such as a halogen lamp, within a lamp house 10, and condensing lenses 12. At the tip of the optical axis $C_2$ of this illumination optical system 4, a beam splitter 5 is located as a light dividing penetration member which is later described in detail. Light from the illumination optical system thus irradiates an observation object 0 through this beam splitter 5 and the objective lens 21.

The recording optical system 3 is located on the opposite side to the side where the eyepiece tube 24 is located, i.e., on the side where the illumination optical system 4 is located, above it. And a beam splitter 5 as the light dividing penetration member is located such that through this member an optical axis $C_1$ of the recording optical system 3 and part of the said illumination optical system coexist. That is, the beam splitter 5 is located on the side of light outlet from the illumination optical system 4. Also located above this beam splitter 5 are a power variable optical system 6 and a reflection mirror 7. By this arrangement the optical axis $C_1$ of the recording optical system 3 and part of the optical axis $C_2$ of the said illumination optical system 4 coexist (i.e., are located co-axially).

This beam splitter 5 reflects light from the illumination optical system 4 and thus transfers it to the objective lens 21 and to an observation objective 0. Further, the beam splitter 5 receives light reflected from the observation object 0 and thus introduces it to the recording optical system 3, if any other object than the beam splitter possesses this function, a half mirror, for example, it may be used as the light dividing penetration member.

By the configuration above described, an optical axis $C_2$ of the illumination optical system 4 is formed wherein light from a light source 11 through condensing lenses 12 is reflected at a beam splitter 5, then penetrated through an objective lens 21 and reaches an observation object 0 and also an optical axis $C_1$ of the recording optical system 3 wherein the light from the observation object 0 penetrates through the objective lens 21 and then through the beam splitter 5 passes through a power variable optical system 6 and continues through a reflection mirror 7 and reaches a relay lens,system 8 for a TV camera and then the actual TV camera 9.

Due to the arrangement of the beam splitter 5, an optical axis $C_1$ of the recording optical system 3 and part of an optical axis $C_2$ of the illumination optical system 4, i.e., the part from the beam splitter 5 to the observation object 0, are made to coincide.

incidentally, the operation microscope, though not shown, is supported so as to be movable in both vertical and horizontal directions by means of a microscope stand.

Operation of an operation microscope 1 of the above-described configuration will be explained subsequently.

As illustrated in FIG. 2, an operation microscope 1 is placed immediately above an observation object 0 located at the bottom of a deep hole. Then, a light source 11 of the illumination optical system 4 is turned on.

Light from the light source 11 is collected by the condensing lenses 12. The light is then reflected by a beam splitter 5, with some light loss, penetrates through an objective lens 21 and finally irradiates an observation object 0.

Part of the reflected light from the observation object 0 penetrates through the objective lens 21 along an optical axis $C_0$. The lights afocal power is then varied with a variable power optical system 28. With an image forming lens 29, an inverted image of the observation object 0 is formed.

The image formed with the image forming lens 29 is turned to the erect state with an erect prism 30. The light, through a reflection prism 31 and a total reflection mirror 32, reaches an eyepiece 33, where the image is again formed for observation by an operator.

Part of the reflected tight from an observation object 0, along an optical axis identical to one for the illumination light, i.e., an optical axis $C_1$, penetrates through an objective lens 21, then reaches a beam splitter 5 and similarly penetrates through this beam splitter. The reflected light, through a variable power optical system 6 and a reflection mirror 7, thus reaches a relay lens system 8 for a TV camera and then a TV camera 9 for recording.

As seen above, the optical axis $C_1$ of the recoding optical system 3, and the optical axis $C_2$ of the illumination optical system 4 are identical. Accordingly, the region of an observation object 0 irradiated with the illumination optical system 4 is recorded without fail by a TV camera 9 of the recording optical system 3. Even when the observation object 0 is located at the bottom of a deep hole, there is no fear that the optical axis $C_1$ of the recording optical system 3 is obstructed by the vicinity of the deep hole, thereby making recording impossible.

Figure 1:
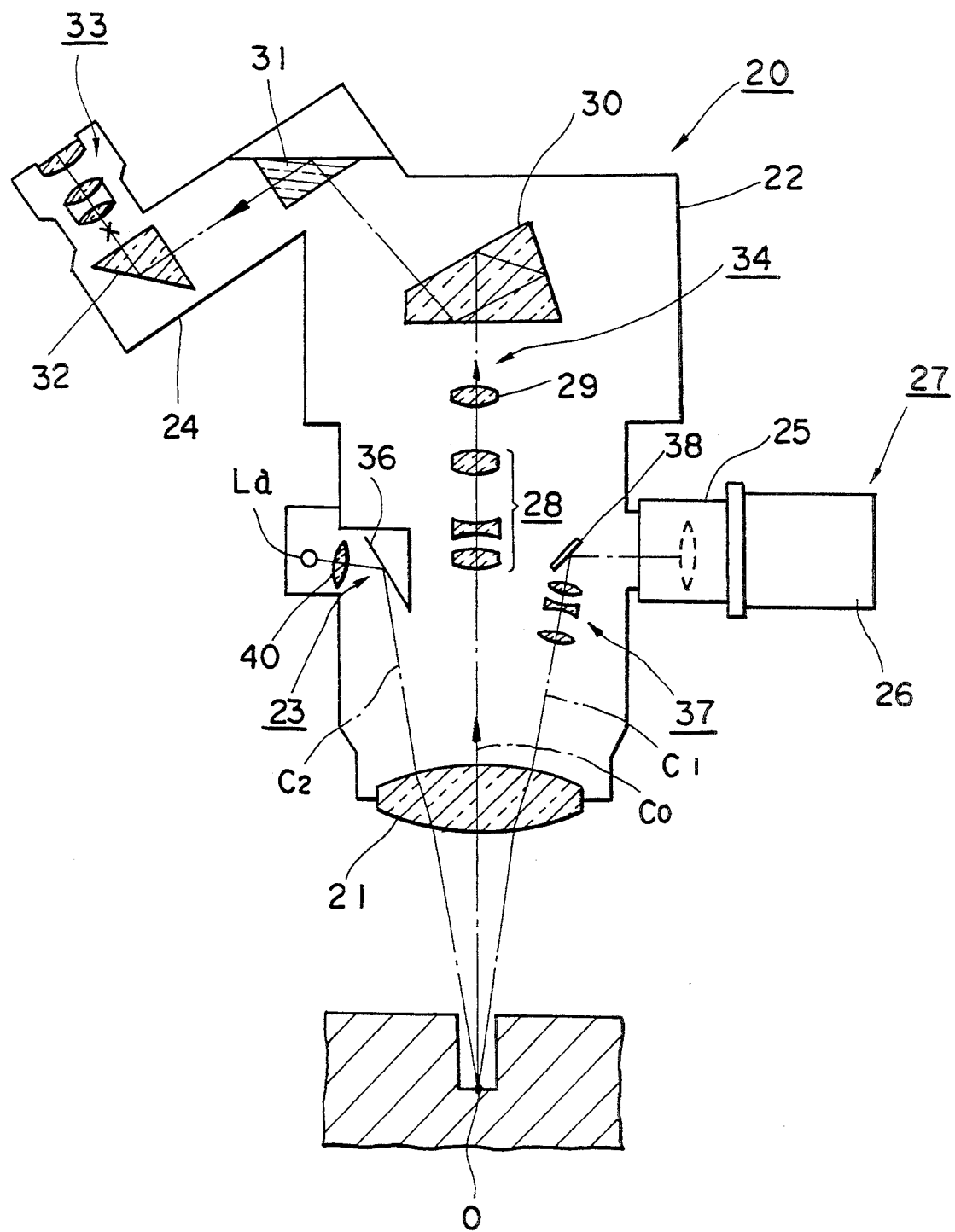
FIG. 1 is a schematic sectional view illustrating the prior art.

Next, in reference to FIG. 3, a modified embodiment of the present invention will be explained. In an operation microscope 1A illustrated in FIG. 3, elements having the identical functions to those in FIG. 1 are designated as symbols.

Figure 3:
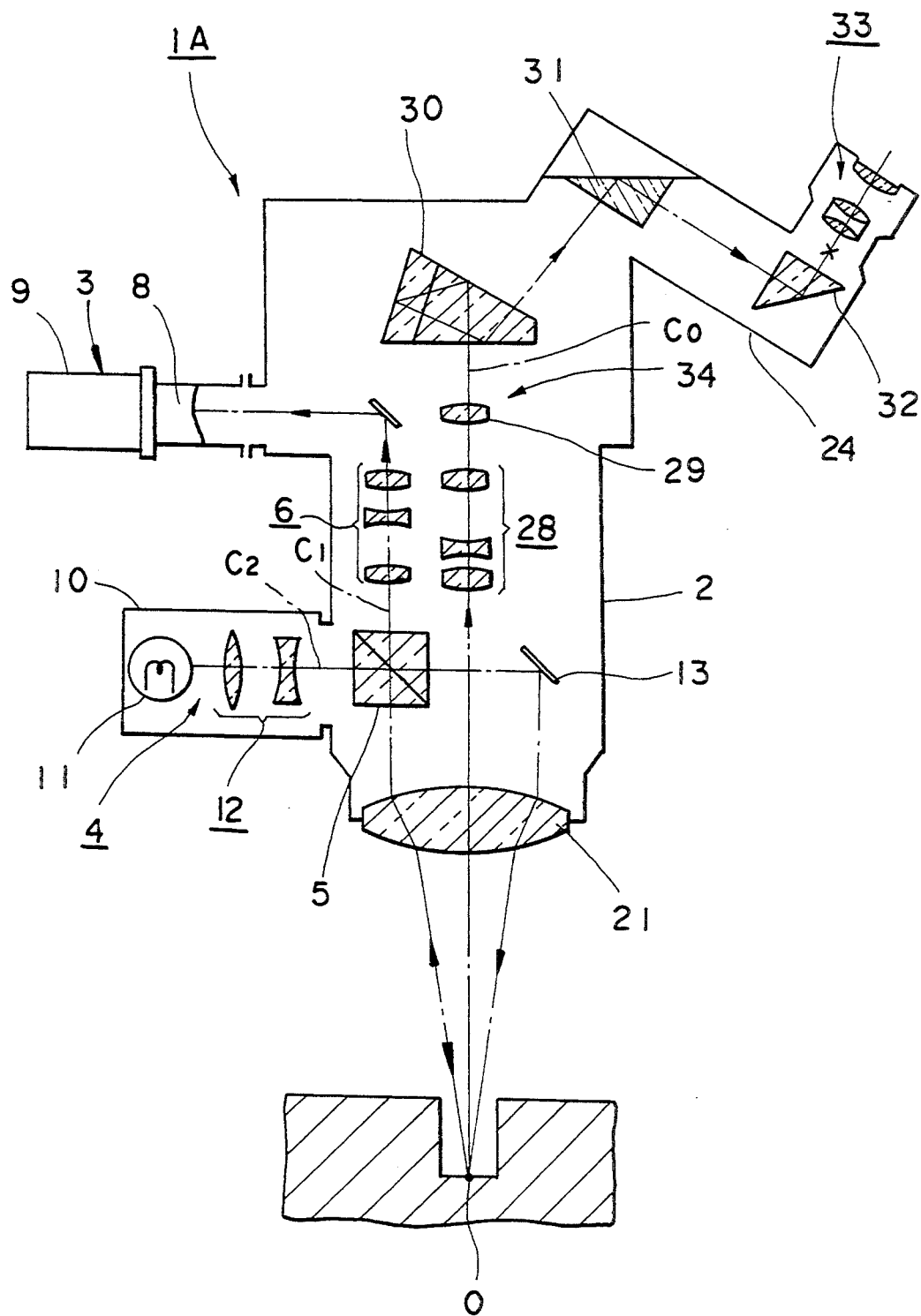
FIG. 3 is a schematic sectional view of a modified embodiment of the invention.

The operation microscope 1A in FIG. 3 is characterized by the fact that an auxiliary reflection mirror 13 for aiding the illumination is added to the configuration of the illumination optical system 4 for the operation microscope. That is, this auxiliary reflection mirror 13 is disposed in lateral direction with respect to the beam splitter 5 within the tube 2. The illumination light penetrated through the beam splitter 5, through the objective lens 21, thus irradiates the observation object 0.

The actual operation of this operation microscope 1A will now be explained, with emphasis placed on function of the auxiliary reflection mirror 13.

If it is assumed that the ratio of reflected light and penetrated light quantities of the illumination light at the beam splitter 5 is 1:1 in the configuration illustrated in FIG. 2, the quantity of light irradiating the observation object 0 becomes approximately 50% of the light quantity entering the beam splitter 5.

On the other hand, in the configuration with an added auxiliary reflection mirror 13, as illustrated in FIG. 3, the illumination light penetrating through the beam splitter 5, by means of the auxiliary reflection mirror 13, through an objective lens 21, irradiates the observation object 0, so that almost 100% of the light quantity entering the beam splitter 5 reaches the observation object 0. Namely, both of (1) the illumination light which is reflected by the beam splitter 5 and penetrates through the objective lens 21 (the light attenuated to 50% by the beam splitter 5) and (2) the illumination light which penetrates through the beam splitter 5, is reflected by the auxiliary reflection mirror 13 and penetrates through the objective lens 21 (the light attenuated to 50% by the beam splitter 5) reach the observation objective 0 so that approximately 100% amount of the irradiated light reaches it.

With the observation optical system 34 and the recording optical system 3 in the operation microscope 1A, it becomes possible to observe and record with larger quantities of light than was possible with the operation microscope 1.

Conversely, when quantities of light to the observation optical system 34 and the recording optical system 3 in both the operation microscopes are assumed to be the same the light quantity of a light source 11 in the operation microscope 1A can be reduced to approximately ½ the light quantity in the operation microscope 1.

The present invention is not limited to the embodiments described above. Various modifications within the scope of its summary are possible.

While the invention has been particularly shown and described in reference to preferred embodiments thereof, it will be understood by those skilled in the art that changes in form and details may be made therein without departing from the spirit and scope of the invention.

What is claimed is:

1. An operation microscope, comprising:

an illumination optical means for irradiating an observation object;

a recording optical means for receiving via an objective lens a reflected light from an observation object for recording;

an observation optical means including a prism for receiving a reflected light from an observation object for observation, wherein the illumination optical means includes a light dividing penetration means for receiving light from a light source, directing the received light onto the objective from the direction different from that of a central optical axis of said objective lens, receiving via said objective lens light from the objective and directing the light to the recording optical means; and an auxiliary reflective mirror means, arranged at a position opposite to said light dividing penetration means with respect to the central optical axis of said objective lens, for reflecting the light which penetrates through said light dividing penetration means of said illumination optical means and proceeds perpendicular to the optical axis of said objective lens and for introducing said light via said objective lens to said observation object.

2. An operation microscope as set forth in claim 1, wherein the light dividing penetration means is a beam splitter.

* * * * *